J. A. ETTLER.
NUT LOCK.
APPLICATION FILED APR. 27, 1920.

1,350,404.

Patented Aug. 24, 1920.

Witness

Inventor,
J. A. Ettler
By C. A. Snow & Co.
Attorneys.

UNITED STATES PATENT OFFICE.

JOHN A. ETTLER, OF SAN FRANCISCO, CALIFORNIA, ASSIGNOR OF ONE-HALF TO JOHN V. OPPEL, OF SAN FRANCISCO, CALIFORNIA.

NUT-LOCK.

1,350,404.　　　　　Specification of Letters Patent.　　Patented Aug. 24, 1920.

Application filed April 27, 1920. Serial No. 377,069.

*To all whom it may concern:*

Be it known that I, JOHN A. ETTLER, a citizen of the United States, residing at San Francisco, in the county of San Francisco and State of California, have invented a new and useful Nut-Lock, of which the following is a specification.

This invention relates to nutlocks and has for its object the provision of a device in which the lock for the nut forms an integral part of the nut.

Another object of the invention is, not only to prevent backward movement of the nut on the bolt but to take up wear that may occur between the nut and bolted parts.

It is further within the province of the disclosure to improve generally and to enhance the utility of devices of that class to which the present invention appertains.

Figure 1:
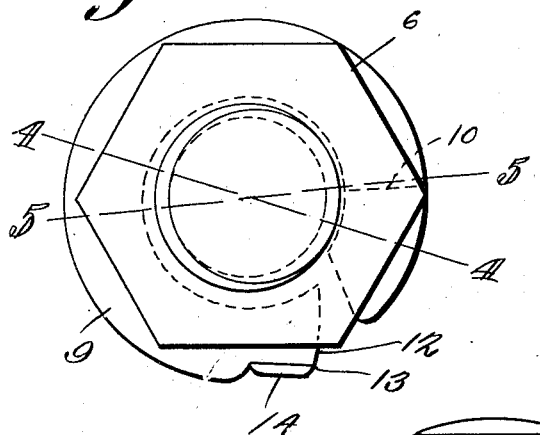
Figure 1 is a plan view of the nut and lock before being forced to locked position.
Figure 2:
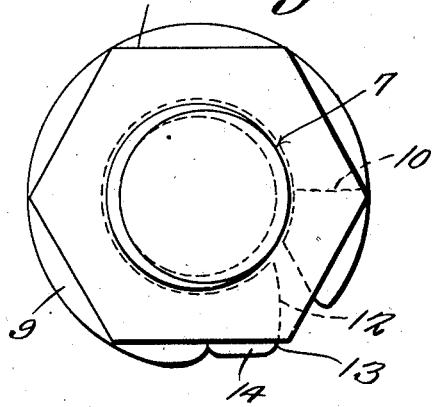
Fig. 2 is a similar view with the parts in locked position.
Figure 3:
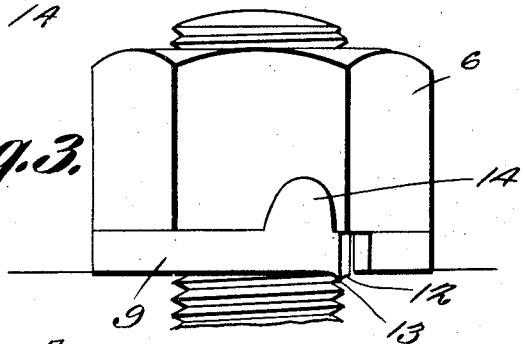
Fig. 3 is a view in side elevation.
Figure 4:
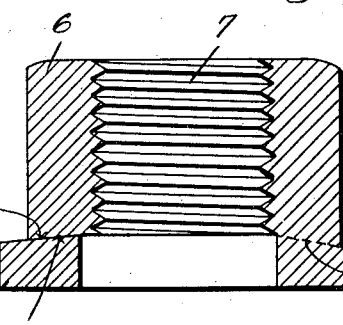
Fig. 4 is a secional view on the line 4—4 of Fig. 1.

Heretofore it has been the practice in bolting various machine parts to use a castellated nut and spring washer on the same bolt. The present invention dispenses with the castellated head on the nut together with the attendant expensive operation of drilling through the bolt for the reception of a cotter pin, and also provides a spring washer to take up the wear, the washer being an integral part of the nut.

Referring particularly to the drawing the numeral 6 denotes a nut of conventional form, being provided with the screw threaded bore 7. The under face 8 of the nut is beveled from the outer edge, upwardly, toward the bore 7, the beveled surface extending over the greater portion of the said face of the nut.

One end of an open ring 9 is secured to the face of the nut as indicated at 10, being made an integral part of the nut by spot welding or other means, or may be forged from the same material forming the nut. The upper face 11 of the ring 9 is beveled to fit the bevel on the lower face of the nut. The free end of the ring 9 is provided with an arcuate cutting edge 12, one end of which has a point 13 projecting below the edge 12. A lug 14 is also formed on the free end of the ring and extends upwardly, the purpose of which will presently appear.

The ring 9 is constructed and attached to the nut with a normal tendency to spring open as shown in Fig. 1 so that when the nut is screwed on a bolt and the point 13 contacts with the surface of the part to be secured by the nut, the ring will close and be placed under tension. Pressure produced by the nut will cause the edge 12 of the ring to cut into the surface with which it contacts and backward movement of the nut on the bolt is prevented.

The edge 12 is formed on a radius, the center of which is outside the circumference of the ring 9, so that should the contacting surfaces of the bolted parts wear, the spring tension of the ring will be exerted to cause the cutting edge to follow the arc on which it is struck and spring outwardly; thus, producing a wedging action between the matching surfaces 8 and 11, which will compensate for wear that may occur between the several parts and the same will be held securely.

Figure 5:
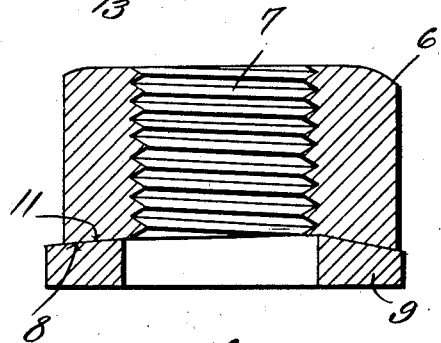
Fig. 5 is a sectional view taken on line 5—5 of Fig. 1.

The pitch of the surfaces 8 and 11 becomes greater from the free end of the ring to the fixed end thereof, this will be apparent from an inspection of Fig. 5. This difference in the inclination of the faces noted is necessary to obtain a full bearing surface between the two faces at all times, that is, the free end of the ring 9 has the greater amount of lateral movement, this movement decreases to nil at the anchored end of the ring, consequently the greater pitch of the coacting faces of the inclines must be at the point of least lateral movement and the least pitch at the point of greatest lateral movement, the inclination of the intermediate portion gradually changing.

When it is desired to remove the nut from the bolt, the ring must be forcibly moved toward the nut and the lug 14 engaged by the wrench or other tool to cause the ring to rotate with the nut and not be led away from the nut by reason of the cutting edge 12 as would otherwise occur, which would result in rupture of the ring.

It will be apparent from the foregoing that an efficient device has been produced having a minimum number of parts and saving time and labor in its use.

Having thus described the invention what I claim is:

1. A nut lock comprising a nut having a circumferential beveled lower face and an open end ring having a beveled face corresponding with the beveled face of the nut, one end of the ring being secured to the nut, the other end of the ring tending to move laterally with relation to the face of the nut, the pitch of the beveled faces of the nut and ring increasing from the free end of the ring to the fixed end thereof, whereby an even bearing surface is maintained between the ring and the nut throughout the lateral movement of the ring.

2. A nut lock comprising a nut having a circumscribed beveled lower face and an open end ring having a beveled face matching the beveled face of the nut, one end of the ring being secured to the nut, the other end of the ring tending to move laterally with relation to the face of the nut when pressure on the ring is released, the free end of the ring having an arcuate scoring edge.

3. A nut lock comprising a nut having a circumferential beveled lower face and an open end ring having a beveled face corresponding with the beveled face of the nut, one end of the ring being secured to the nut, the other end of the ring tending to move laterally with relation to the face of the nut, the pitch of the beveled faces of the nut and ring increasing from the free end of the ring to the fixed end thereof, the free end of the ring having an arcuate scoring edge.

In testimony that I claim the foregoing as my own, I have hereto affixed my signature in the presence of two witnesses.

JOHN A. ETTLER.

Witnesses:
ALFRED FUHRMAN,
J. GUSTAS.